United States Patent
Degenaro et al.

(10) Patent No.: US 8,185,654 B2
(45) Date of Patent: May 22, 2012

(54) SYSTEMS AND METHODS FOR CONTENT-AWARE LOAD BALANCING

(75) Inventors: Louis R. Degenaro, White Plains, NY (US); Lei Gao, Austin, TX (US); Arun Kwangil Iyengar, Yorktown Heights, NY (US); Jian Yin, Ossining, NY (US)

(73) Assignee: International Business Machines Corporation, Armok, NY (US)

(*) Notice: Subject to any disclaimer, the term of this patent is extended or adjusted under 35 U.S.C. 154(b) by 124 days.

(21) Appl. No.: 12/132,811

(22) Filed: Jun. 4, 2008

(65) Prior Publication Data

US 2008/0235397 A1 Sep. 25, 2008

Related U.S. Application Data

(63) Continuation of application No. 11/094,905, filed on Mar. 31, 2005.

(51) Int. Cl.
*G06F 15/173* (2006.01)
*G06F 9/46* (2006.01)

(52) U.S. Cl. .......................................... 709/238; 718/105
(58) Field of Classification Search ................... 709/241, 709/238; 718/105
See application file for complete search history.

(56) References Cited

U.S. PATENT DOCUMENTS

| | | | |
|---|---|---|---|
| 6,189,043 B1* | 2/2001 | Buyukkoc et al. | 709/241 |
| 7,222,190 B2* | 5/2007 | Klinker et al. | 709/238 |
| 2003/0028636 A1* | 2/2003 | Cherkasova et al. | 709/225 |
| 2003/0046394 A1* | 3/2003 | Goddard et al. | 709/226 |
| 2003/0229710 A1 | 12/2003 | Lie et al. | |
| 2005/0076104 A1 | 4/2005 | Liskov et al. | |
| 2006/0031374 A1 | 2/2006 | Lu et al. | |
| 2006/0080388 A1 | 4/2006 | Cherkasova et al. | |
| 2006/0168107 A1 | 7/2006 | Balan et al. | |

FOREIGN PATENT DOCUMENTS

| | | |
|---|---|---|
| EP | 1 027 796 B1 | 6/2004 |
| WO | WO 01/13228 A2 | 2/2001 |
| WO | WO 02/089014 A1 | 11/2002 |

OTHER PUBLICATIONS

V. Pai et al, "Locality-Aware Request Distribution in Cluster-Based Network Servers," Proceedings of ASPLOS-VIII, pp. 1-12, Oct. 1998.
C.S. Yang et al., "Efficient Support for Content-Based Routing in Web Server Clusters," Proceedings of USITS'99: The 2nd USENIX Symposium on Internet Technologies & Systems, 13 pages, Oct. 1999.
X. Long et al., "Locality-Aware Request Distribution for Static and Dynamic Content in Clustered Network Servers," www.andrew.cmu.edu/user/xlong/finalGPP.htm, 8 pages.

* cited by examiner

*Primary Examiner* — Jerry Dennison
(74) *Attorney, Agent, or Firm* — Preston J. Young; Ryan, Mason & Lewis, LLP (57) ABSTRACT

Improved load balancing techniques are disclosed. For example, in one illustrative aspect of the invention, a method of satisfying requests in a system comprised of a plurality of servers comprises the following steps. At least one load balancer is provided for routing requests to the plurality of servers. At the at least one load balancer, a request sent from a client is obtained. At the at least one load balancer, the request is examined. Costs of satisfying the request by at least two of the plurality of servers are estimated. The estimation is based on at least one of a number and a cost of at least one remote access for satisfying the request. The request is routed to a server of the plurality of servers with a low estimated cost of satisfying the request.

22 Claims, 6 Drawing Sheets

SYSTEMS AND METHODS FOR CONTENT-AWARE LOAD BALANCING

CROSS-REFERENCE TO RELATED APPLICATION(S)

This application is a continuation of pending U.S. application Ser. No. 11/094,905 filed on Mar. 31, 2005, the disclosure of which is incorporated herein by reference.

FIELD OF THE INVENTION

The present invention generally relates to information systems and, more particularly, to techniques for content-aware load balancing in such information systems.

BACKGROUND OF THE INVENTION

In general, an information system is a data processing system that provides some form of response to a user upon a user's request. The Internet or World Wide Web (WWW or the "web") is easily the most ubiquitous information system that exists today.

Scalable web sites associated with the Internet typically comprise one or more load balancers for routing requests to a plurality of servers. The techniques used for load balancing the requests can have a significant effect on performance of the overall system. If requests are routed in a content-aware fashion, then the load balancer is aware of the contents of a request and can make more intelligent routing decisions.

One of the drawbacks to content-aware routing compared with content-unaware routing is that content-aware routing usually incurs significantly more overhead. Therefore, the benefits for performing content-aware routing must be significant enough to justify the higher overhead.

Content-aware routing techniques have been proposed, for example, as described in V. Pai et al., "Locality-Aware Request Distribution in Cluster-Based Network Servers," Proceedings of ASPLOS-VIII, October 1998, the disclosure of which is incorporated by reference herein. However, the content-aware routing disclosed in the above-referenced work is primarily intended for static requests and thus uses techniques for selecting servers which are not always well suited for dynamic requests. Techniques described in C. S. Yang et al., "Efficient Support for Content-Based Routing in Web Server Clusters," Proceedings of the 2nd USENIX/IEEE Symposium on Internet Technologies and Systems (USITS '99), the disclosure of which is incorporated by reference herein, provide content-aware routing only for static content. Thus, existing work in content-aware routing is not sufficient to handle the data partitioning problems which occur in major deployments.

Accordingly, a need exists for techniques which overcome the above-mentioned and other limitations associated with existing content-aware routing techniques.

SUMMARY OF THE INVENTION

The present invention provides improved load balancing techniques.

For example, in a first aspect of the invention, a method of satisfying requests in a system comprised of a plurality of servers comprises the following steps. At least one load balancer is provided for routing requests to the plurality of servers. At the at least one load balancer, a request sent from a client is obtained. At the at least one load balancer, the request is examined. Costs of satisfying the request by at least two of the plurality of servers are estimated. The estimation is based on at least one of a number and a cost of at least one remote access for satisfying the request. The request is routed to a server of the plurality of servers with a low estimated cost of satisfying the request.

The step of routing may be accomplished by classifying a request into a partition and routing the request to a server hosting the partition. In the step of providing at least one load balancer, the at least one load balancer may comprise at least one content-unaware load balancer routing requests to a plurality of content-aware load balancers. Further, in the step of providing at least one load balancer, at least one of the plurality of content-aware load balancers may reside on at least one of the plurality of servers.

The step of estimating costs may further comprise the steps of examining at least one parameter included in the request and using information about how data are partitioned among the plurality of servers to estimate at least one of numbers and costs of remote accesses for satisfying the request. The step of obtaining a request may further comprise obtaining a request that is sent using the Transmission Control Protocol/Internet Protocol and the step of examining the request may further comprise accepting a TCP connection. The step of estimating costs may comprise estimating at least one of a measure of resource utilization and a desired service level for satisfying the request. Further, the step of estimating costs may vary with respect to at least one of a number of servers and time. Still further, in the step of obtaining, at the at least one load balancer, a request from a client, the request may comprise a request for dynamic data.

In a second aspect of the invention, a method of satisfying requests in a system comprised of a plurality of servers comprises the following steps. At least one load balancer is provided for routing requests to the plurality of servers. At the at least one load balancer, a request sent from a client is obtained. At the at least one load balancer, the request is examined. Costs of satisfying the request by at least two of the plurality of servers are estimated. Information obtained in the estimating step is sent from the load balancer to a server of the plurality of servers along with the request. At the server, the information is used to satisfy the request.

In a third aspect of the invention, a system for satisfying requests from at least one client comprises a plurality of servers, at least one content-aware load balancer for routing requests to the plurality of servers, and at least one cost analyzer associated with the at least one content-aware load balancer for estimating costs of satisfying requests by different servers based on at least one of numbers and costs of remote accesses for satisfying requests.

In a fourth aspect of the invention, apparatus for satisfying requests from at least one client in a system comprised of a plurality of servers comprises a memory and at least one processor coupled to the memory and operative to: (i) obtain a request from a client; (ii) examine content of the request; and (iii) estimate costs of satisfying the request by at least two of the plurality of servers based on estimating at least one of a number and a cost of at least one remote access for satisfying the request. The request may then be routed to a server of the plurality of servers with a low estimated cost of satisfying the request.

In a fifth aspect of the invention, a method of satisfying requests from at least one client in a system comprised of a plurality of servers comprises the following steps. A request is obtained from a client. Content of the request is examined. Costs of satisfying the request by at least two of the plurality of servers are estimated. The estimation is based at least one of a number and a cost of at least one remote access for satisfying the request. The request may then be routed to a server of the plurality of servers with a low estimated cost of satisfying the request.

In a sixth aspect of the invention, an article of manufacture for use in satisfying requests from at least one client in a system comprised of a plurality of servers comprises a machine readable medium containing one or more programs which when executed implement the steps of obtaining a request from a client, examining content of the request, and estimating costs of satisfying the request by at least two of the plurality of servers based on estimating at least one of a number and a cost of at least one remote access for satisfying the request. The request may then be routed to a server of the plurality of servers with a low estimated cost of satisfying the request.

In a seventh aspect of the invention, a method of providing a load balancing service comprises the step of a service provider providing a service to a customer which comprises obtaining a request from a client, examining content of the request, and estimating costs of satisfying the request by at least two of the plurality of servers based on estimating at least one of a number and a cost of at least one remote access for satisfying the request. The request may then be routed to a server of the plurality of servers with a low estimated cost of satisfying the request.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative Internet or web-based client-server environment. However, it is to be understood that the present invention is not limited to such Internet or web implementations. Rather, the invention is more generally applicable to any request-based environment in which it would be desirable to provide enhanced load balancing performance.

Furthermore, content that is to be served in response to a request may be referred to generally herein as an "object." An "object" may take on many forms and it is to be understood that the invention is not limited to any particular form. For example, an object may be an electronic document such as one or more web pages. One skilled in the art could use the invention in a variety of different electronic document formats including, but not limited to, HTML (HyperText Markup Language) documents, XML (eXtensible Markup Language) documents, text documents in other formats, and binary documents. Also, the phrase "electronic document" may also be understood to comprise one or more of text data, binary data, one or more byte streams, etc. Thus, the invention is not limited to any particular type of data object. Still further, it is to be understood that the term "overhead" may include, but is not limited to, computer CPU (central processing unit) cycles, network bandwidth consumption, disk, I/O (input/output), etc.

Figure 1:
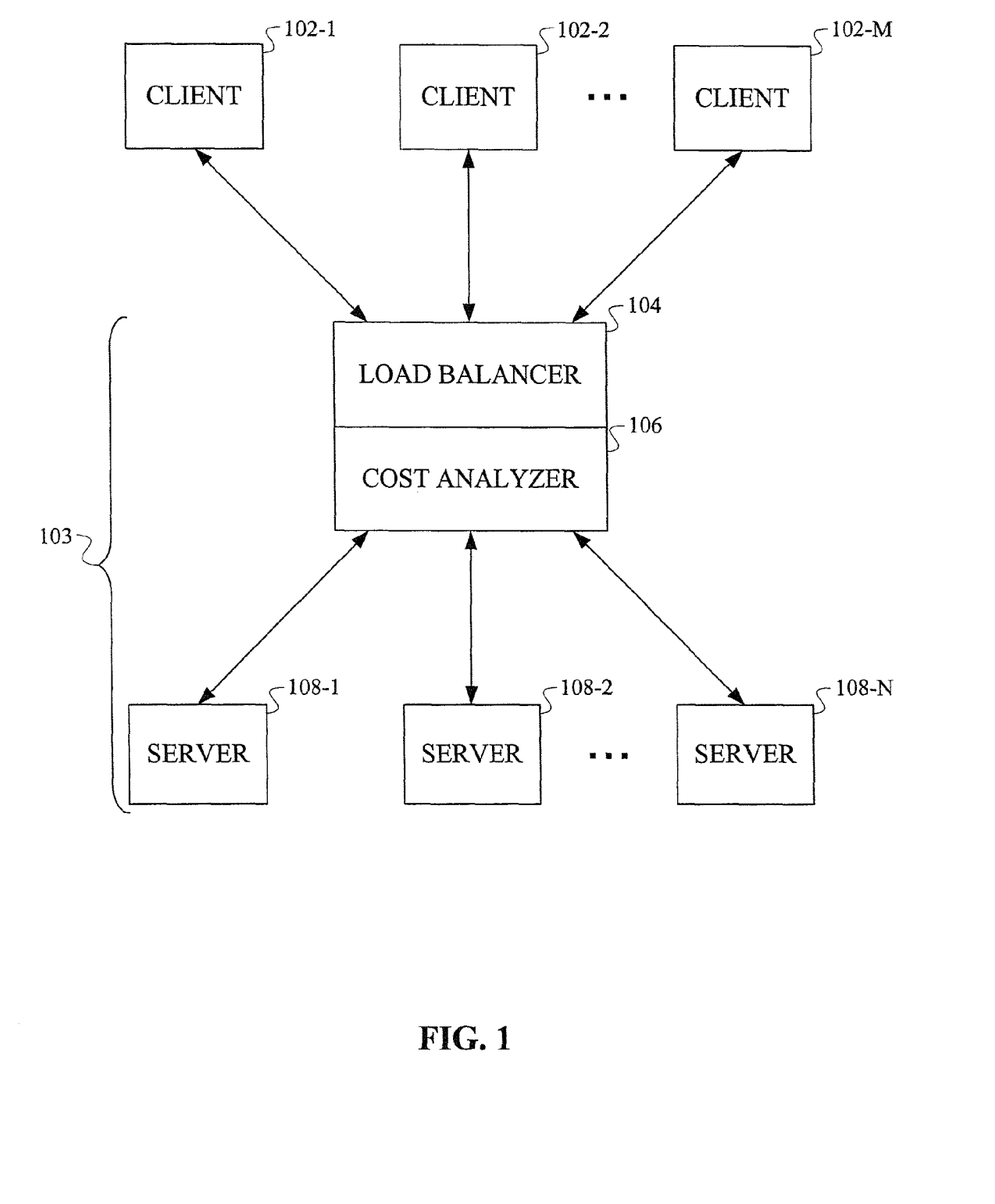
FIG. 1 is a diagram illustrating a server system architecture according to an embodiment of the present invention.

Referring initially to FIG. 1, a server system architecture, according to an embodiment of the present invention is illustrated. As shown, one or more clients (e.g., 102-1 . . . 102-M) send one or more requests to a server system 103. It is to be appreciated that the clients (by way of example only, personal computers, personal digital assistants, cellular phones, etc.) may be coupled to server system 103 via the Internet or some other wired and/or wireless communications network. The invention is not limited to any particular communications network. Also, it is to be understood that the term "request" is not limited only to requests for the return of data content from the server system. Depending on the particular application, a request may have different purposes and/or seek different results. The invention is not limited to any particular type of request.

Server system 103 includes a load balancer 104, a cost analyzer 106, and a plurality of servers 108-1 . . . 108-N. Cost analyzer 106 aids load balancer 104 in determining which one of the plurality of servers a request should be routed to. The load balancer may be content aware. In other words, load balancer 104 may have the ability to determine the contents of a request in order to make more intelligent routing decisions.

A content-aware load balancer can incur significantly more overhead for handling requests than a content-unaware load balancer. For example, if communication is taking place via Transmission Control Protocol/Internet Protocol (TCP/IP), then a content-aware load balancer would typically accept a TCP connection in order to examine the contents of a request. This step incurs considerable overhead and would normally not be required by a content-unaware load balancer.

Figure 2:
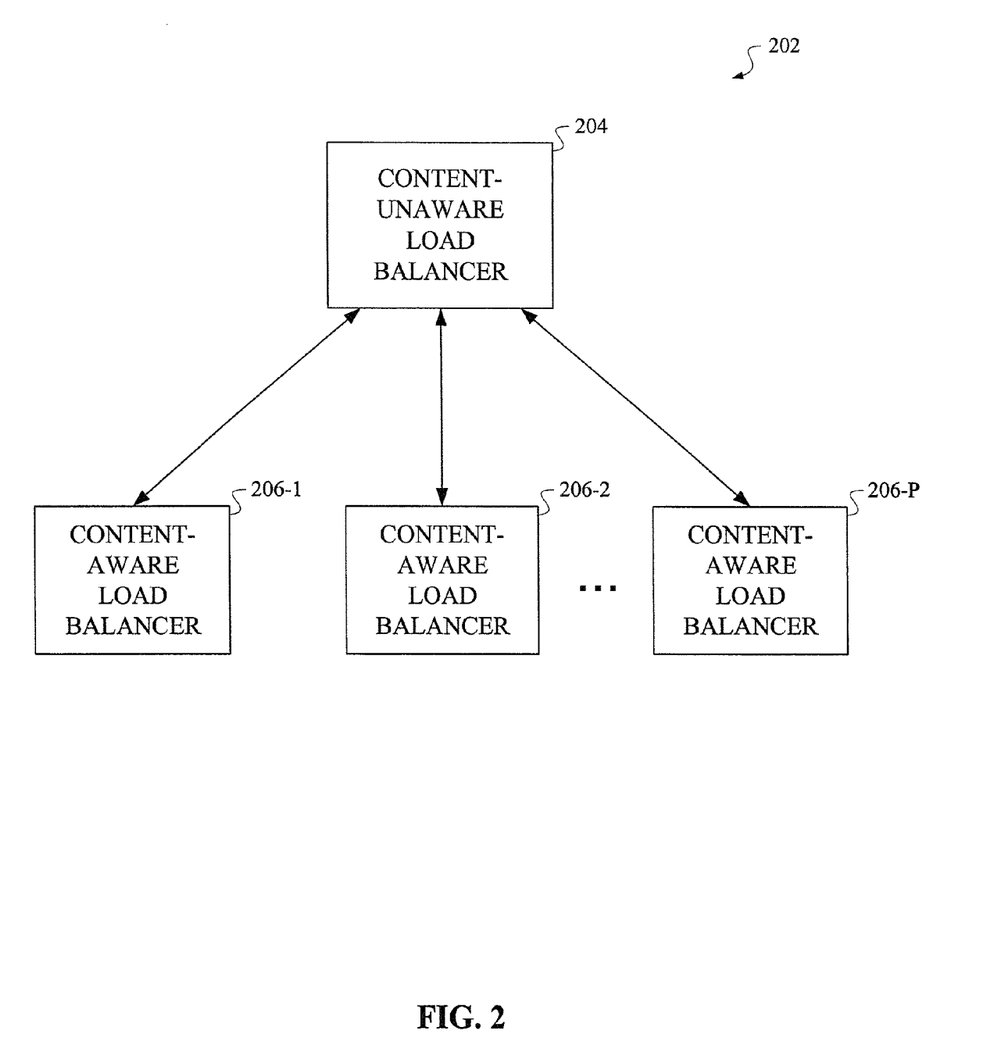
FIG. 2 is a diagram illustrating a system for scaling a content-aware load balancer, according to an embodiment of the present invention.

Principles of the invention provide features for scaling up content-aware load balancers to handle high request rates. FIG. 2 depicts one such feature.

Referring now to FIG. 2, a system is illustrated for scaling a content-aware load balancer, according to an embodiment of the present invention. As shown, server system 202 includes a content-unaware load balancer 204 and a plurality of content-aware load balancers 206-1 . . . 206-P.

Requests received from one or more clients (not shown) are initially routed to content-unaware load balancer 204 which subsequently routes requests to one or more of the plurality of content-aware load balancers 206-1 . . . 206-P. The content-unaware load balancer has higher throughput than any of the individual content-aware load balancers. A variety of schemes may be used by the content-unaware load balancer for sending requests to the content-aware load balancers including, but not limited to, round robin or methods considering the load on the content-aware load balancers.

Figure 3:
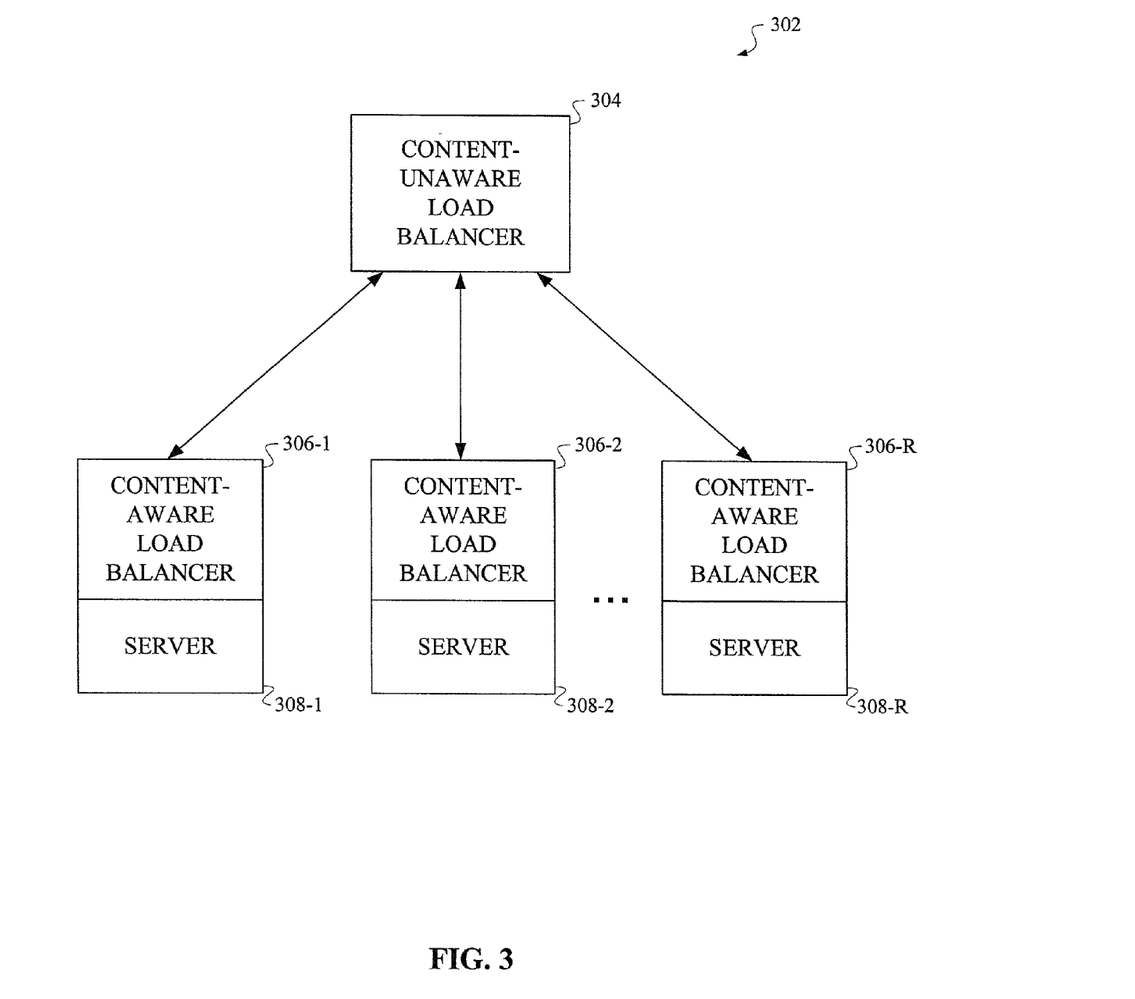
FIG. 3 is a diagram illustrating a system in which content-aware load balancers are integrated with servers, according to an embodiment of the present invention.

Referring now to FIG. 3, a generalization of FIG. 2 is depicted in which content-aware load balancers are integrated with (e.g., reside on) one or more servers. That is, as shown, server system 302 includes content-unaware load balancer 304 and a plurality of content-aware load balancers 306-1 ... 306-R respectively integrated with a plurality of servers 308-1 ... 308-R.

Figure 4:
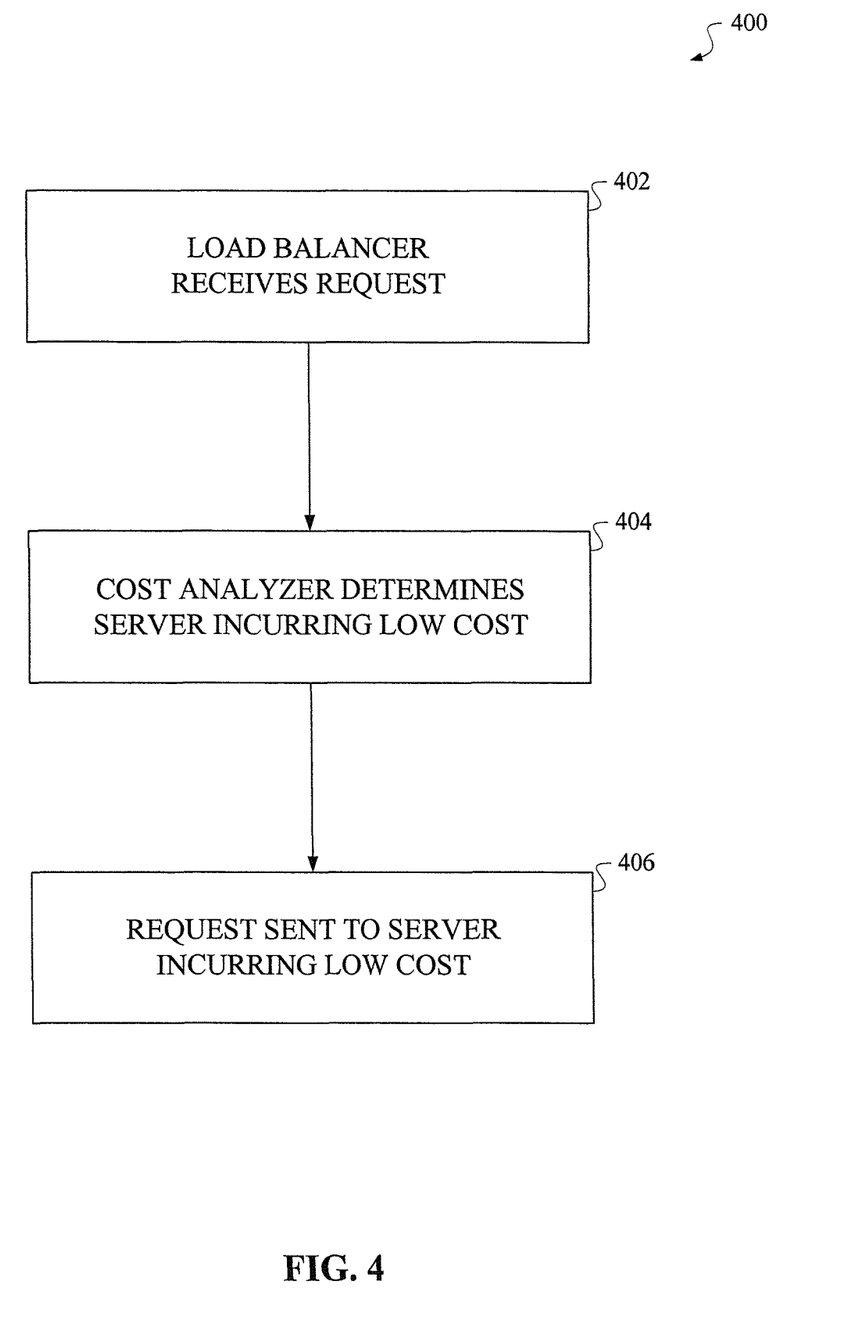
FIG. 4 is a diagram illustrating a method for load balancing requests, according to an embodiment of the present invention.

Referring now to FIG. 4, a method 400 is illustrated for load balancing requests, according to an embodiment of the present invention. The server system architecture of FIG. 1 will be referenced to illustrate the steps of method 400. However, it is to be appreciated that other server systems architecture (e.g., those shown in FIGS. 2 and 3, as well as others not expressly shown) may be employed.

In step 402, a load balancer (e.g., 104 of FIG. 1) receives a request. In step 404, a cost analyzer (e.g., 106 of FIG. 1) examines the request and identifies a server (e.g., 108-1 ... 108-N) which will likely incur a low cost for satisfying the request. In step 406, the request is routed to a server identified in step 404.

Figure 5:
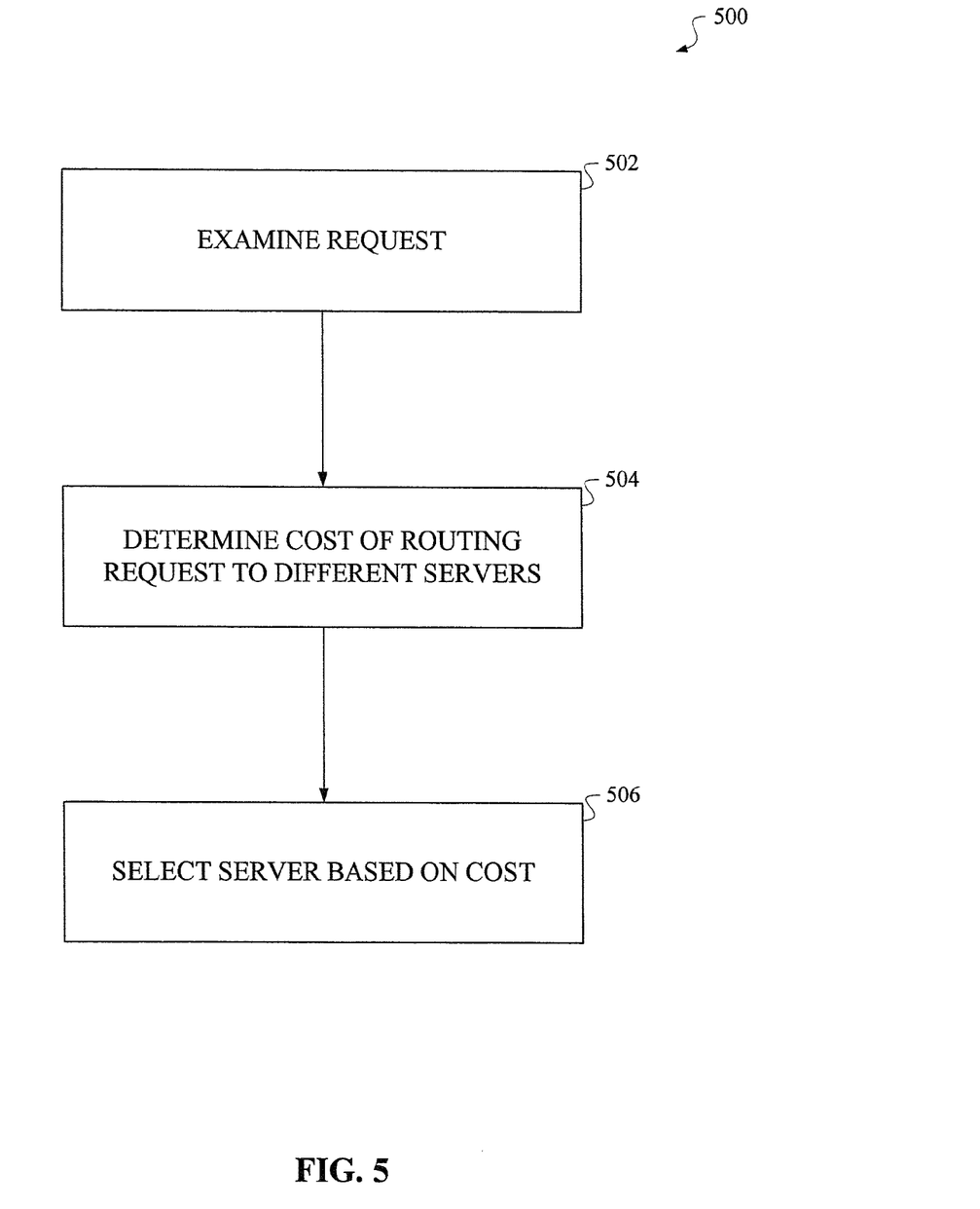
FIG. 5 is a diagram illustrating a method for selecting a server based on cost, according to an embodiment of the present invention.

There are a variety of ways in which step 404 may be implemented. FIG. 5 depicts one illustrative method.

Referring now to FIG. 5, a method 500 is illustrated for selecting a server based on cost, according to an embodiment of the present invention. In step 502, the request is examined. If the TCP/IP protocol is being used for communication, step 502 may involve accepting a TCP connection. The request may contain one or more parameters.

In one embodiment, data are partitioned among the servers 108-1 ... 108-N asymmetrically. The proper server to handle a request depends on the request. For example, suppose that data are partitioned based on a name parameter. If there are three servers, then one server could handle names beginning with A through I, a second server could handle names beginning with J through R, and a third server could handle names beginning with S through Z.

When a request is received by the load balancer (e.g., step 402 of FIG. 4), in the scenario described above, a parameter corresponding to the request would contain the name. For example, if the name was "Smith," then the request would be routed to the third sever. If the name was "Jones," then the request would be routed to the second server.

In another scenario, the data are partitioned among the servers (108-1 ... 108-N) in a more complicated fashion. A request routed to a server may result in a number of different accesses to non-local data depending on how the request is routed. By "non-local," it is meant that the data sought are not stored at the server that initially receives the request, but rather is stored on a server or other network element remote from that server. For example, if the request is routed to the first server, this might result in three remote accesses. If the request is routed to the second server, this might result in one remote access. If the request is routed to the third server, this might result in eight remote accesses. These determinations would be made in step 504 based on the contents of the request.

It is to be appreciated that one of the features of the invention, but not the only feature, which distinguishes it from existing techniques such as, for example, the ASPLOS-VIII and USITS'99 papers mentioned above is that the inventive techniques can be used for requests for dynamic data as well as for static data. By contrast, the above-referenced papers describe content-aware routing techniques which are only well-suited for static data. A request for static data is a request for data, such as a file, which exists at the time that a request is made. A request for dynamic data is one in which program code is executed in order to satisfy the request. For example, ordering an item at an e-commerce web site would typically be implemented as at least one dynamic request. The order might result in several database accesses, persistent state changes at the server, and an acknowledgement which is generated on-the-fly and sent back to the client in response to the order.

Satisfying dynamic requests is typically much more complicated than satisfying static requests. The overhead for dynamic requests is also generally much higher. The inventive methods used for selecting servers are thus different from those which have been proposed for selecting servers for static content.

An application may be analyzed to determine how it can best be partitioned to run on a set of servers. Partitions are often defined to have little interactions with other partitions and thus the state needing to be shared is minimized. Logically, each partition may be associated with a part of a computational task, which may include the code and state to process a specific set of requests.

Partitioning can be done statically by analyzing the business logic of the application. These partitions can be further refined at run time based on on-line workload statistics. Thus, the cost analyzer not only is preferably aware of the initial partitions but also may implement the logic to repartition the application online.

The cost analyzer may take a global view of the application to determine how to partition the application to minimize the cost of processing a particular set of requests. The cost of processing requests generally includes central processing unit (CPU) overhead and also the communication overhead of synchronizing the underlying state that may be shared by several backend servers. Thus, the cost analyzer may also determine how widely a piece of data should be replicated. While replicating a piece of data widely may increase the overall capacity of processing the requests associated with this piece of data, it may also increase the cost of synchronizing the data across all of the replicas. Thus, it is desirable for the cost analyzer to balance consistency requirements, request rates, and synchronization patterns of the data.

Conversely, not-replicating data may also be considered by the cost analyzer. It may be more advantageous to route requests for particular data to one or a few servers hosting said data in order to avoid data replication costs. Further, the aggregate caching capabilities of a set of severs may be better utilized. For example, each of three servers comprising a server set, each equally capable of servicing any one request, may be able to cache only one of three frequently used large objects at any one time due to size constraints. The cost analyzer may choose to place large object A on server 1, large object B on server 2, and large object C on server 3. Subsequently, requests for each object would be routed to a server according to its cached location. In this example, each large object is able to be cached on at least one server which results in overall improved performance. Thus, the cost analyzer can improve horizontal scalability of applications by making intelligent decisions about requests for service and where to service them based upon request content.

The underlying data held by servers may need to be migrated before request routing can be changed. Migrating underlying data typically comes with a cost. Thus, the cost analyzer may also take the cost of state migration into account to optimize routing.

Since remote accesses are costly, it is desirable to minimize them. In step 506, the system selects a server to route the request to based on the costs determined in step 504. In the example from the previous paragraph, the second server would normally be the one selected since it requires only one remote access. If the second server is highly loaded compared to the first server, however, the first server might be selected in certain cases.

When the system determines costs of routing requests to different servers in step 504, this determination does not have to be completely accurate. In several cases, an estimate will suffice. In performing this determination, the system might execute code that determines parameters of the request, which servers need to be contacted to satisfy the request, or other information that can help satisfy the request. A straightforward approach would be to determine this information once by the cost analyzer and a second time by the server to which the request is routed. This approach incurs overhead due to the redundant calculations. An optimization to alleviate these redundant calculations is for the cost analyzer to store the relevant information in the request and send the augmented request to a server. The server then accesses information stored in the augmented request by the cost analyzer to obtain relevant information for satisfying the request and avoiding redundant calculations. A compiler can perform program transformation techniques on the program code for satisfying requests to fully or partially automate this optimization.

The cost analyzer may consider partition definition, partition-to-server assignment, and desired optimization. Partition definition is the process of classifying requests into partitions. Partition-to-server assignment is the process of deciding on which server a classified request is to be handled (in other words, on which server a partition is to be located). Desired optimization considers how to best distribute partitions amongst available servers. Individual partitions can be moved from one server to another on demand.

The cost analyzer can make dynamic determinations for each of the control variables. For example, cost analyzer off-line analysis of system utilization may recommend a different classification into partitions scheme; or recommend a different allocation of partitions to servers. Further, cost analysis results may be different for varying numbers of servers in the server set, and may vary over time.

For varying numbers of servers, one partition-to-server allocation scheme may be optimal for two servers, another for three servers, another for four servers, and so forth. For example, say the partitions are named $\{0, 1, 2, 3, \ldots 9\}$. For two servers, cost analysis may determine that optimal assignment is for partitions 0-6 to be assigned to server 1 and 7-9 to server 2. For three servers, the cost analyzer may recommend partitions 0-3 be assigned to server 1, partitions 4-7 be assigned to server 2 and partitions 8-9 be assigned to server 3.

For time variability, the desired cost optimization function may specify one assignment of partitions to servers for the period 8 AM to 5 PM, then another assignment during the period 5 PM to 8 AM.

The cost analyzer need not optimize on "best" utilization of resources from the system's perspective. A simple service request load balancing technique to utilize a system is to round robin requests to each in a set of servers; or to choose the server with the least utilized CPU. Instead, the cost analyzer may classify requests and route them based upon said classification results, even though this may not result in the "best" utilization from the system's perspective.

Cost analysis may consider quality of service requirements. For example, a "gold" customer may be directed to a "fast" speed partition, a "silver" customer may be directed to a "medium" speed partition, and a "bronze" customer may be directed to a "slow" speed partition. That is, the cost analyzer may not always seek to optimize from the system's perspective, but rather relative to the request's importance.

It is to be further appreciated that the present invention also comprises techniques for providing load balancing services. By way of example, a content provider agrees (e.g., via a service level agreement or some informal agreement or arrangement) with a customer or client to provide content. Then, based on terms of the service contract between the content provider and the content customer, the content provider provides content to the content customer in accordance with one or more of the load balancing methodologies of the invention described herein.

Figure 6:
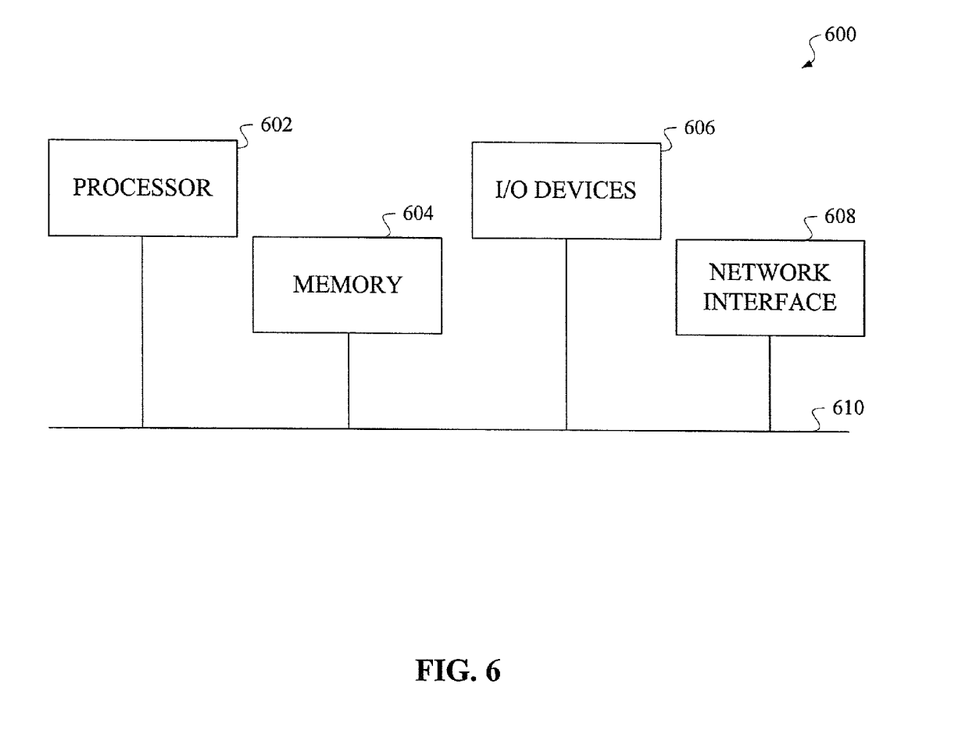
FIG. 6 is a diagram illustrating a computing system in accordance with which one or more components/steps of a load balancing system may be implemented, according to an embodiment of the present invention.

Referring finally to FIG. 6, a computing system is illustrated in accordance with which one or more components/steps of a load balancing system (e.g., components and methodologies described in the context of FIGS. 1 through 5) may be implemented, according to an embodiment of the present invention. It is to be understood that the individual components/steps may be implemented on one such computer system, or more preferably, on more than one such computer system. In the case of an implementation on a distributed computing system, the individual computer systems and/or devices may be connected via a suitable network, e.g., the Internet or World Wide Web. However, the system may be realized via private or local networks. The invention is not limited to any particular network.

Thus, the computing system shown in FIG. 6 represents an illustrative computing system architecture for a load balancer, a server, a cost analyzer, and/or combinations thereof, within which one or more of the steps of the load balancing techniques of the invention may be executed.

As shown, the computer system 600 may be implemented in accordance with a processor 602, a memory 604, I/O devices 606, and a network interface 608, coupled via a computer bus 610 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for satisfying requests in a system comprised of a plurality of servers, comprising the steps of:
   providing at least one load balancer for routing requests to the plurality of servers;
   obtaining, at the at least one load balancer, a request from a client;
   examining, at the at least one load balancer, the request;
   estimating costs of satisfying the request by at least two of the plurality of servers based on estimating at least one of a number and a cost of at least one remote access for satisfying the request;
   augmenting the request, at the at least one load balancer, with at least a portion of information obtained during the cost estimation step such that the server to which the request is routed refrains from performing redundant calculations to determine the information used to augment the request; and
   routing the request to a server of the plurality of servers with a low estimated cost of satisfying the request.

2. The method of claim 1, wherein the step of routing is accomplished by classifying a request into a partition and routing the request to a server hosting the partition.

3. The method of claim 1, wherein, in the step of providing at least one load balancer, the at least one load balancer comprises at least one content-unaware load balancer routing requests to a plurality of content-aware load balancers.

4. The method of claim 3, wherein, in the step of providing at least one load balancer, at least one of the plurality of content-aware load balancers resides on at least one of the plurality of servers.

5. The method of claim 1, wherein the step of estimating costs further comprises the steps of:
   examining at least one parameter included in the request; and
   using information about how data are partitioned among the plurality of servers to estimate at least one of numbers and costs of remote accesses for satisfying the request.

6. The method of claim 1, wherein the step of obtaining a request further comprises obtaining a request that is sent using the Transmission Control Protocol/Internet Protocol and wherein the step of examining further comprises accepting a TCP connection.

7. The method of claim 1, wherein the step of estimating costs comprises estimating at least one of a measure of resource utilization and a desired service level for satisfying the request.

8. The method of claim 1, wherein the step of estimating costs may vary with respect to at least one of a number of servers and time.

9. The method of claim 1, wherein, in the step of obtaining, at the at least one load balancer, a request from a client, the request comprises a request for dynamic data.

10. A method of satisfying requests in a system comprised of a plurality of servers, comprising the steps of:
    providing at least one load balancer for routing requests to the plurality of servers;
    obtaining, at the at least one load balancer, a request from a client;
    examining, at the at least one load balancer, the request;
    estimating costs of satisfying the request by at least two of the plurality of servers;
    sending, from the load balancer, information obtained in the estimating step to a server of the plurality of servers along with the request; and
    using, at the server, the information to satisfy the request, such that the server refrains from performing redundant calculations to determine the information.

11. A system for satisfying requests from at least one client, comprising:
    a plurality of servers;
    a computing device comprising a memory for storing program instructions, and a processor for processing the program instructions to implement:
    at least one content-aware load balancer; and
    at least one cost analyzer associated with the at least one content-aware load balancer for estimating costs of satisfying requests by different servers based on at least one of numbers and costs of remote accesses for satisfying requests,
    wherein the at least one content-aware load balancer routes requests to the plurality of servers and augments the requests with at least a portion of information obtained during the cost estimation process such that the servers to which the requests are routed refrain from performing redundant calculations to determine the information used to augment the requests.

12. The system of claim 11, wherein the at least one content-aware load balancer comprises a plurality of content-aware load balancers and wherein the system further comprises at least one content-unaware load balancer for routing requests to the plurality of content-aware load balancers.

13. The system of claim 12, wherein at least one of the plurality of content-aware load balancers resides on at least one of the plurality of servers.

14. The system of claim 11, wherein a request is routed by classifying the request into a partition and routing the request to a server hosting the partition.

15. The system of claim 11, wherein the at least one cost analyzer estimates costs by examining at least one parameter included in the request, and using information about how data are partitioned among the plurality of servers to estimate at least one of numbers and costs of remote accesses for satisfying the request.

16. Apparatus for satisfying requests from at least one client in a system comprised of a plurality of servers, the apparatus comprising:
    a memory; and
    at least one processor coupled to the memory and operative to:
    obtain a request from a client;
    examine content of the request;
    estimate costs of satisfying the request by at least two of the plurality of servers based on estimating at least one of a number and a cost of at least one remote access for satisfying the request; and
    augment the request with at least a portion of information obtained during the cost estimation step such that at least one of the plurality of servers refrains from performing redundant calculations to determine the information used to augment the request.

17. A method for satisfying requests from at least one client in a system comprised of a plurality of servers, comprising the steps of:
    obtaining a request from a client;
    examining content of the request;
    estimating costs of satisfying the request by at least two of the plurality of servers based on estimating at least one of a number and a cost of at least one remote access for satisfying the request; and
    augmenting the request with at least a portion of information obtained during the cost estimation step such that at least one of the plurality of servers refrains from performing redundant calculations to determine the information used to augment the request.

18. An article of manufacture for use in satisfying requests from at least one client in a system comprised of a plurality of servers, comprising a non-signal machine readable medium containing one or more programs which when executed implement the steps of:
  obtaining a request from a client;
  examining content of the request;
  estimating costs of satisfying the request by at least two of the plurality of servers based on estimating at least one of a number and a cost of at least one remote access for satisfying the request; and
  augmenting the request with at least a portion of information obtained during the cost estimation step such that at least one of the plurality of servers refrains from performing redundant calculations to determine the information used to augment the request.

19. A method for providing a load balancing service, comprising the step of:
  a service provider providing a service to a customer which comprises:
    obtaining a request from a client;
    examining content of the request;
    estimating costs of satisfying the request by at least two of the plurality of servers based on estimating at least one of a number and a cost of at least one remote access for satisfying the request; and
    augmenting the request with at least a portion of information obtained during the cost estimation step such that at least one of the plurality of servers refrains from performing redundant calculations to determine the information used to augment the request.

20. The method of claim 9, wherein the request further comprises a request for static data.

21. The method of claim 20, wherein the dynamic data does not exist at the time the request is made and requires execution of program code in order to satisfy the request and the static data exists at the time the request is made.

22. The method of claim 3, wherein the at least one content-unaware load balancer has higher throughput than any of the plurality of content-aware load balancers.

* * * * *